(12) United States Patent
Kumar et al.

(10) Patent No.: US 9,945,352 B2
(45) Date of Patent: Apr. 17, 2018

(54) WIND TURBINE BLADE HAVING A SHAPED STALL FENCE OR FLOW DIVERTER

(71) Applicant: LM WP PATENT HOLDING A/S, Kolding (DK)

(72) Inventors: Arun Kumar, Bangalore (IN); Ashish Singh, Lucknow (IN)

(73) Assignee: LM WP PATENT HOLDING A/S, Kolding (DK)

( * ) Notice: Subject to any disclaimer, the term of this patent is extended or adjusted under 35 U.S.C. 154(b) by 361 days.

(21) Appl. No.: 14/414,869

(22) PCT Filed: Jul. 24, 2013

(86) PCT No.: PCT/EP2013/065579
§ 371 (c)(1),
(2) Date: Jan. 14, 2015

(87) PCT Pub. No.: WO2014/016326
PCT Pub. Date: Jan. 30, 2014

(65) Prior Publication Data
US 2015/0176564 A1    Jun. 25, 2015

(30) Foreign Application Priority Data

Jul. 25, 2012 (EP) .................................. 12177815

(51) Int. Cl.
*F03D 11/00* (2006.01)
*F03D 1/06* (2006.01)

(52) U.S. Cl.
CPC ......... *F03D 1/0641* (2013.01); *F03D 1/0675* (2013.01); *Y02E 10/721* (2013.01)

(58) Field of Classification Search
CPC .............................. F03D 1/0641; F03D 1/0633
USPC ........................................................ 416/236 R
See application file for complete search history.

(56) References Cited

U.S. PATENT DOCUMENTS

| | | | | |
|---|---|---|---|---|
| 1,446,011 A * | 2/1923 | Jackson | ................... | B63H 1/28 |
| | | | | 416/236 A |
| 4,128,363 A | 12/1978 | Fujikake | | |
| 7,585,157 B2 * | 9/2009 | Quell | .................... | F03D 1/0633 |
| | | | | 416/236 R |
| 7,637,715 B2 * | 12/2009 | Battisti | .................. | F03D 80/40 |
| | | | | 290/55 |

(Continued)

FOREIGN PATENT DOCUMENTS

EP          0947693 A2    10/1999

*Primary Examiner* — Logan Kraft
*Assistant Examiner* — Jason Fountain
(74) *Attorney, Agent, or Firm* — Nath, Goldberg & Meyer; Jerald L. Meyer; Tanya E. Harkins

(57) ABSTRACT

A wind turbine blade is described wherein at least on planar member is provided on the blade surface, where the planar member is arranged such that it extends at an angle to the chord of the blade. The planar member acts to re-direct airflow over the blade, to improve wind turbine performance. The planar member may be a stall fence provided towards the blade root end, further acting to divert airflow towards the root end of the blade to prevent separation of attached airflow. Additionally or alternatively, the planar member may be a flow diverter provided towards the blade tip end, to increase airflow in the tip region for increased performance and/or to disrupt the formation of tip vortices.

18 Claims, 11 Drawing Sheets

(56) References Cited

U.S. PATENT DOCUMENTS

| | | | |
|---|---|---|---|
| 8,038,396 B2* | 10/2011 | Anjuri | F03D 7/0236 416/1 |
| 8,777,580 B2* | 7/2014 | Eisenberg | F03D 1/0633 416/239 |
| 2006/0280614 A1 | 12/2006 | Quell | |

* cited by examiner

WIND TURBINE BLADE HAVING A SHAPED STALL FENCE OR FLOW DIVERTER

This is a National Phase Application filed under 35 U.S.C. 371 as a national stage of PCT/EP2013/065579, filed Jul. 24, 2013, an application claiming the benefit under 35 USC 119(e) European Application No. 12177815.3, filed Jul. 25, 2012, the content of each of which is hereby incorporated by reference in its entirety.

FIELD OF THE INVENTION

The present invention relates to a wind turbine blade having a shaped planar member as a stall fence or flow diverter.

BACKGROUND OF THE INVENTION

In wind turbine blades, cross-flows of airflow sometimes propagate along the longitudinal length of the wind turbine blade, from the root end of the blade. Such cross-flows act to negatively impact on blade performance, in particular by contributing to airflow detachment from the surface of the blade, thereby affecting blade lift.

It is known to provide a barrier or stall fence which extends across the surface of a wind turbine blade, transverse to the longitudinal axis, to prevent the formation of such cross-flows. An example of such a wind turbine blade can be seen in U.S. Pat. No. 7,585,157.

While this system prevents the cross-flows from propagating along the blade length by providing a barrier between adjacent sections of the blade, during rotation of the wind turbine blades the centrifugal forces generated during rotation act to push airflow along the length of the blade towards the tip end. This results in the formation of low-pressure areas in the wake of the stall fences towards the trailing edge of the blades, resulting in flow separation and resultant reduction in blade performance.

It is an object of the invention to provide a wind turbine blade having a projecting member which provides improved performance over existing stall fence systems.

SUMMARY OF THE INVENTION

Accordingly, there is provided a wind turbine blade for a rotor of a wind turbine having a substantially horizontal rotor shaft, said rotor comprising a hub, from which the blade extends substantially in a radial direction when mounted to the hub, the blade having a longitudinal direction with a tip end and a root end and a transverse direction, the blade further comprising:
  a profiled contour including a pressure side and a suction side, as well as a leading edge and a trailing edge with a chord line having a chord length extending there between, the chord line transverse to said longitudinal direction, the profiled contour, when being impacted by an incident air-flow, generating a lift,
  wherein the wind turbine further comprises first and second flow guide members provided on a surface of said wind turbine blade, wherein said first and second flow guide members extend in a direction substantially transverse to the longitudinal direction of the blade, said first and second flow guide members defining a flow channel between said leading edge and said trailing edge, said flow channel having a first end located towards said leading edge and a second end located towards said trailing edge,
  wherein at least a portion of one of said first and second flow guide members extends along the transverse direction of said blade at an angle to said chord line of between +1/-[15 to 60] degrees, and
  wherein said flow channel comprises at least one constricted section spaced from said first end towards said second end, wherein the distance between said first and second flow guide members at said at least one constricted section is less than the distance between said first and second flow guide members at the first end of said flow channel,
  such that attached flow in said flow channel between said first and second flow guide members from said first end to said second end is subjected to a Venturi effect by said at least one constricted section.

By providing a flow channel having a constriction, flow passing through this flow channel will be accelerated due to the Venturi effect of the constriction. As a result of the Venturi effect, the core flow (i.e. flow outside boundary layer) will accelerate, which will in turn feed more energy to the boundary layer flow. Energized boundary layer flow has a greater probability of overcoming adverse pressure gradients and accordingly results in a delay in airflow separation over the airfoil, resulting in improved blade performance. The converging stall fences will further act to restrict cross flow, similar to traditional stall fences.

In a preferred embodiment, said at least one constricted section is located at said second end of said flow channel.

By providing the constriction at the second end, airflow will be accelerated for the entire length of the flow channel. If the flow channel extends along substantively all of the chordal extent of the wind turbine blade, this will help to delay airflow separation across the entire width of the blade.

Additionally or alternatively, the flow channel of the wind turbine blade may comprise at least one constricted section located between said first end and said second end.

By providing a constriction somewhere along the length of the flow channel, a Venturi effect can be created at a point where it is desired to ensure that increased flow speed will delay flow separation from the blade. It will be understood that a plurality of constrictions may be provided along the length of the flow channel.

In one embodiment, the wind turbine blade comprises a first constricted section located between said first end and said second end of said flow channel and a second constricted section located at said second end of said flow channel,
  wherein the width of said flow channel between said first and second flow guide members tapers from said first end to said first constricted section and subsequently widens towards said second end to provide a first Venturi effect on flow in said flow channel, and
  wherein the width of said flow channel between said first and second flow guide members subsequently tapers towards said second constricted section at the second end of said flow guide channel to provide a second Venturi effect.

This configuration allows for a further acceleration of flow over the blade due to the use of two separate constrictions. Preferably, said second constricted section is located within 5% of the length of the flow channel from said second end of said flow channel, but it will be understood that the length of second constriction may vary according to the thickness of the airfoil used. As flow separation may occur at an early stage for thicker airfoils, accordingly thicker airfoil may require relatively longer constriction sections.

Preferably, said first constricted section of said flow channel is located between said leading edge and said trailing edge approximately at the area of maximum thickness of the profiled contour.

By locating said first constriction at or adjacent the point of maximum airfoil thickness, flow over the blade may be further accelerated due to the high acceleration at this point. As airflow separation generally occurs after the maximum thickness point of the airfoil, accordingly it is preferred that flow is accelerated beyond the maximum thickness section of the airfoil.

Preferably, said first and second flow guide members comprise respective flow channel surfaces, the flow channel surfaces of said first flow guide facing the flow channel surface of said second flow guide across said flow channel, wherein at least a portion of at least one of said flow channel surfaces is curved.

By providing a surface having a curved taper, a gradual change in member shape can be provided. Accordingly, the flow guide members can be shaped to reduce any negative effects on the aerodynamics of the overall blade structure, and the maximum thickness of this curvature can be positioned in such a way to meet or enhance desired aerodynamics.

The flow channel surfaces may be curved along the extent of the flow guide member in a direction substantially transverse to the longitudinal direction of the blade, and/or along the height of the flow guide member. It will be understood that the flow channel surfaces may comprise a concave or a convex curve with respect to the interior of the flow channel defined between said first and second flow guide members, preferably at least one of said flow channel surfaces comprises a convex curve along the length of the flow guide member between said first and second ends of said flow channel. Additionally or alternatively, the height of at least one flow guide member may vary in a direction substantially transverse to the longitudinal direction of the blade, in order to meet or enhance desired aerodynamics.

Preferably, at least a portion of said first and second flow guide members extend in a convergent direction towards the second end of said flow channel to form said at least one constricted section, such that attached flow in said flow channel between said first and second flow guide members is subjected to a Venturi effect.

In one embodiment, said flow channel comprises a substantially rectangular cross-section. Alternatively, said flow channel comprises a substantially trapezoidal cross-section. It will be understood that said flow channel is preferably an open flow channel.

In one embodiment, at least a portion of both of said first and second flow guide members extend at an angle to a chord line transverse to the longitudinal direction of said blade of between +/−[15 to 60] degrees.

Alternatively, one of said first and second flow guide members extends substantially along the transverse direction of said blade at an angle to said chord line of between +/−[15 to 60] degrees, wherein the other of said first and second flow guide members extends along the transverse direction of said blade parallel to said chord line/orthogonal to the longitudinal direction of said blade.

One of the flow guide members may be formed by a traditional transverse stall fence or barrier, orthogonal to the blade longitudinal direction, while the other of the flow guide members is arranged at an angle to the transverse direction to form the constriction in the flow channel.

Preferably, the flow guide members are formed from planar members projecting from the surface of the wind turbine blade, e.g. a stall fence or stall barrier. The flow guide members may be formed as an integral part of a wind turbine blade body, or may be retrofitted to an existing wind turbine blade.

Preferably, said flow channel is formed from flow guide members provided on the suction side of the wind turbine blade.

Preferably, said flow guide members extend in a substantially straight line between said respective first ends to said respective second ends.

Preferably, said first and second flow guide members are located on the inboard portion of the blade, e.g. within 50% of the length of the blade from the root end of the blade, preferably within 20% of the length of the blade of the point of maximum chord of the blade, further preferably within 10% of the length of the blade of the point of maximum chord of the blade. Further preferably, the flow guide members may be located wherever flow separates on the blade.

Preferably, the length between said first end and said second end of said flow channel is between approximately 50-100% of chord length of the wind turbine blade at the location of said flow channel, preferably between approximately 75%-85%.

Additionally or alternatively, the orthogonal height of the flow guide members near said first and/or second end of said flow channel is approximately zero, i.e. the flow guide members are flush with the surface of the blade. Preferably, the height of the flow guide members gradually increases from said zero height at said first end to a first height between said first end and said second end and/or decreases from a first height between said first end and said second end to said zero height at said second end.

As the flow guide members may have a zero height at the first and/or second ends, which gradually tapers to the full height of the flow guide members, this can provide a smoother aerodynamic transition for the flow guide members which does not significantly affect the blade aerodynamics.

Additionally or alternatively, said first end of said flow channel is located adjacent the leading edge of the blade, preferably within approximately 20% of chord length of the wind turbine blade at the location of said flow channel, further preferably within approximately 10% of the chord length.

Additionally or alternatively, said second end of said flow channel is located adjacent the trailing edge of the blade, preferably within approximately 20% of chord length of the wind turbine blade at the location of said flow channel, further preferably within approximately 10% of the chord length.

Preferably, the width of said flow channel at said at least one constricted section is between approximately 50-80% of the width of said flow channel at said first end.

In a further aspect, there is provided a wind turbine blade for a rotor of a wind turbine having a substantially horizontal rotor shaft, said rotor comprising a hub, from which the blade extends substantially in a radial direction when mounted to the hub, the blade having a longitudinal direction with a tip end and a root end and a transverse direction, the blade further comprising:

a profiled contour including a pressure side and a suction side, as well as a leading edge and a trailing edge with a chord line having a chord length extending therebetween, the profiled contour, when being impacted by an incident air-flow, generating a lift, the wind turbine further comprising at least one planar member provided on a surface of said wind turbine blade, at least a section of said at least one planar member extending along the transverse direction of said blade at an angle to said chord line of between +/−15-60 degrees, preferably between +/−30-45 degrees, further preferably between +/−20-40 degrees, said at least one planar member acting to direct attached flow over the profiled contour of said blade.

The use of an angled planar member allows for airflow over the surface of the blade to be directed towards particular sections of the blade to improve blade performance, e.g. increased lift, reduced drag, etc. If the planar member is provided towards the root end of the blade, the planar member acts as a stall fence to prevent cross-flow, as well as acting as a compressor towards the root end of the blade, increasing the pressure at the root end of the blade. On the outboard side of the planar member, pressure will decrease and hence delay flow separation along the outboard sections of the blade. If the planar member is provided towards the tip end of the blade, the planar member acts as a flow diverter to move more airflow towards the tip section, where the performance benefits are greater.

Preferably, said at least one planar member extends from a first end adjacent said leading edge to a second end adjacent said trailing edge, preferably wherein said first end is located within 0-5% of the length of said chord from said leading edge, preferably wherein said second end is located within 0-5% of the length of said chord from said trailing edge.

As the planar member substantially extends between the leading and trailing edges of the blade, this allows for the attached flow to be routed across substantially the entire chordal length of the blade profile. The at least one planar member may be arranged to extend substantially in the direction of the root end of the blade, forming a shaped stall fence. Additionally or alternatively, the at least one planar member may be arranged to extend substantially in the direction of the tip end of the blade, forming a flow deflector.

Preferably, at least a first section of said at least one planar member extends at an angle $\alpha$ to said chord line, wherein said angle $\alpha$ is between approximately +/−15-60 degrees to said chord line, wherein said at least a first section extends along at least 30% of the chordal extent of the profiled contour, preferably along at least 50%, further preferably along at least 70%.

In this embodiment, a section of the planar member extends at a particular angle to the chord for at least a portion of the chordal length of the blade.

Preferably, said at least one planar member extends from said first end to said second end at an angle $\alpha$ to said chord line, wherein said angle $\alpha$ is between approximately +/−15-60 degrees to said chord line.

In this embodiment, the entire planar member is provided at an angle to the chord of the blade, such that a continual deflection of airflow of the blade can be achieved.

Preferably, said at least one planar member extends from said first end to said second end at an angle $\alpha$ to said chord, wherein angle $\alpha$ varies from approximately 0 degrees at said first end to approximately +/−30-60 degrees at said second end, preferably +/−45 degrees.

In this embodiment, the angle which the planar member makes to the chord of the blade varies with distance along the length of the planar member. The planar member has an angle $\alpha$ of approximately 0 degrees towards the leading edge of the blade, to reduce any impact on aerodynamic performance towards the blade leading edge. The angle $\alpha$ at the second end of the planar member may be selected to provide maximum deflection of airflow, with minimum impact on aerodynamic performance. The angle $\alpha$ at the second end may be selected from any of the following: approximately 15, 30, 45 degrees.

In a preferred embodiment, angle $\alpha$ varies linearly between said first end and said second end.

This provides for a constant variation of the angle $\alpha$ along the length of the planar member. In an alternative embodiment, the rate of change of angle $\alpha$ may vary along the length of the planar member, from a low rate of change, e.g. 0-5%, towards the first end of the planar member, to a higher rate of change, e.g. 5-50%, towards the second end of the planar member.

Preferably, said at least one planar member projects from a surface of said wind turbine blade, at a constant angle $\beta$ to said surface, wherein said angle $\beta$ is selected from the range between 45-135 degrees.

The angle of projection of the stall fence may be any suitable angle, and not limited to a 90 degree angle with respect to the surface of the blade.

Alternatively, said at least one planar member projects from a surface of said wind turbine blade, at an angle $\beta$ to said surface, wherein said angle $\beta$ varies from approximately 0 degrees at said first end to between approximately 45-180 degrees at said second end, preferably between 90-180 degrees, preferably between 90-135 degrees, alternatively between 45-90 degrees.

The planar member may be shaped or comprise a twist to provide improved performance when re-directing flow over the surface of the blade.

Preferably, said angle $\beta$ varies linearly between said first end and said second end.

Additionally or alternatively, at least a section of said at least one planar member comprises a cross-section having a curved portion.

The curved section of the planar member allows for the airflow to be more efficiently redirected over the surface of the wind turbine blade.

Preferably, said at least one planar member comprises a base end adjacent a surface of said blade, and a tip end distal from said surface, wherein at least a section of said at least one planar member comprises a curved portion between said base end and said tip end, wherein the tangential angle $\theta$ of said curved portion varies between a first angle towards said base end and a second angle towards said tip end, wherein said first angle is substantially orthogonal to the surface of the wind turbine blade and wherein said second angle is substantially parallel to the surface of the wind turbine blade. Preferably, said first angle is between 45-135 degrees to the surface of the wind turbine blade. Preferably, said second angle is between 135-215 degrees to the surface of the wind turbine blade.

Preferably, $\theta$ is measured in the direction of the root end of the blade. In one embodiment, $\theta$ varies between approximately 90-180 degrees to the surface of the wind turbine blade. In this embodiment, the tip end of the curved section points substantially in the direction of the tip end of the wind turbine blade.

In an alternative embodiment, $\theta$ varies between approximately 90-0 degrees to the surface of the wind turbine blade. In this embodiment, the tip end of the curved section points substantially in the direction of the root end of the wind turbine blade.

In a preferred embodiment, said at least a section of said at least one planar member is curved along the entire height of said planar member between said base end and said tip end.

A constantly curving member acts to provide a duct to route airflow across the blade, Alternatively, said at least a section of said at least one planar member comprises a substantially straight portion provided at the base end of said planar member and a curved portion provided at the tip end of said planar member, said substantially straight portion having a constant angle β to the surface of said wind turbine blade, said curved portion having a varying tangential angle θ.

As an alternative, only a portion of the planar member may be curved along the height of the planar member. This may increase the difficulty for airflow to route over the tip or tip end of the planar member.

In one embodiment, the at least one planar member may be formed from several individual sections. Preferably, said sections may be assembled to form a single continuous planar member. Alternatively, said sections may be provided on said wind turbine blade spaced from each other, said spaced sections acting to form an array of planar members, said array forming a virtual stall fence or flow diverter.

In a further embodiment, the at least one planar member comprises at least one gap provided along the length of the planar member between a first end of said planar member and a second end of said planar member, wherein said gap acts to equalise pressure across the at least one planar member, to lower the drag effect caused by the at least one planar member.

In one embodiment, said gap is formed by a through-going channel provided in said at least one planar member.

Alternatively, said planar member is formed from a plurality of discrete planar member components provided on the surface of the wind turbine blade, said discrete planar member components substantially in line with a nominal planar member profile, wherein at least one gap is formed by a spacing between adjacent discrete planar member components.

Adjacent discrete planar member components may be offset relative to a nominal planar member profile to provide a gap extending across a section of the width of the nominal planar member as well as a section of the length of the nominal planar member.

Preferably, the wind turbine blade comprises a plurality of planar members provided on the surface of the wind turbine blade. Additionally or alternatively, said at least one planar member may be provided on at least a section of the pressure side of the wind turbine blade.

Preferably, said at least one planar member comprises at least one stall fence provided on said suction side towards the root end of said blade, wherein said at least one stall fence extends from a first end adjacent said leading edge to a second end, wherein at least a section of the at least one stall fence extends from said first end towards said second end at a substantially acute angle to said chord line, taken in the direction of the root end of the blade.

As at least a section of the stall fence is arranged at an angle to the chord line towards the root end of the blade, then attached flow over the blade contour will be directed towards the root end of the blade, thereby delaying separation of the flow during rotation of the blade. An acute angle is taken to mean an angle of between 0-90 degrees with respect to the chord line of the blade, taken in the direction of the root end of the blade.

Preferably, said at least one stall fence projects from the surface of said wind turbine blade at an angle β to said surface, wherein said at least one stall fence projects substantially in the direction of the root end of the wind turbine blade.

Preferably, said at least one stall fence is provided on said suction side within 0-50% of the length of said wind turbine blade from said root end.

The shaped stall fence is located in the root end half of the blade, firstly to prevent lengthwise airflow along the length of the blade, and secondly to prevent flow separation at the root end of the blade due to the relatively thick cross-section of the blade at the root end of the blade.

Preferably, said first end of said at least one stall fence is located on said suction side within 0-5% of the length of said chord from said leading edge.

Alternatively, wherein said first end of said at least one stall fence projects beyond said leading edge, said first end forming a leading edge deflector, to direct airflow at the leading edge of said wind turbine blade towards said root end.

As the stall fence is arranged to project beyond the leading edge of the blade, the presence of at least one leading edge deflector helps to reduce outbound flow along the length of the blade.

Preferably, said leading edge deflector extends from said first end towards the root end of said blade, said leading edge deflector extending at an acute angle to a nominal chord line extended beyond said leading edge.

As the leading edge deflector is provided at an angle, the leading edge deflector provides for further re-direction of flow towards the root end of the blade, reducing the effect of flow separation at the blade root end.

Preferably, said second end of said at least one stall fence is located on said suction side within 0-5% of the length of said chord from said trailing edge.

In this embodiment, the stall fence extends across substantially the entire chordal length of the blade.

Preferably, the wind turbine blade comprises at least one flow diverter provided on said suction side towards the tip end of said blade, wherein said at least one flow diverter extends from a first end adjacent said leading edge to a second end, wherein at least a section of the at least one flow diverter extends towards said tip end at a substantially acute angle to said chord, to direct laminar flow over the profiled contour towards said tip end.

The flow diverter acts to increase airflow towards the outer area of the blade, to improve blade performance by modifying the blade tip vortex.

Preferably, said at least one flow diverter projects from the surface of said wind turbine blade at an angle β to said surface, wherein said at least one flow diverter projects substantially in the direction of the tip end of the wind turbine blade.

There is also provided a wind turbine blade having a planar member projecting from a surface of the wind turbine blade, preferably a stall fence or a flow diverter, wherein at least a portion of said planar member comprises a substantially curved cross-sectional profile.

In such a system, a planar member, which may extend substantially between a trailing edge and a leading edge of a blade, is enhanced by the addition of a curved cross-section, as described above for the shaped or angled planar member system.

There is provided a projecting planar member for a blade may be provided having an angle α with respect to the chordal plane of the blade, and an angle β with respect to the blade surface, the planar member arranged such that the values α and/or β vary between the first and second ends of the planar member, preferably in a linear variation along at least 30% of the length of the planar member.

Additionally or alternatively, there is further provided a wind turbine blade having a planar member provided on a surface of said blade, the planar member extending substantially between the leading edge and the trailing edge of said wind turbine blade, wherein at least a portion of said planar member comprises a curved cross-section.

It will be understood that the feature of a planar member, e.g. a flow diverter or a stall fence, having a curved cross-section may be implemented separately to the arrangement of a planar member provided at an acute angle to the chordal plane of a wind turbine blade.

There is further provided a wind turbine having at least one wind turbine blade as described above.

DESCRIPTION OF THE INVENTION

An embodiment of the invention will now be described, by way of example only, with reference to the accompanying drawings, in which.

Figure 10A:
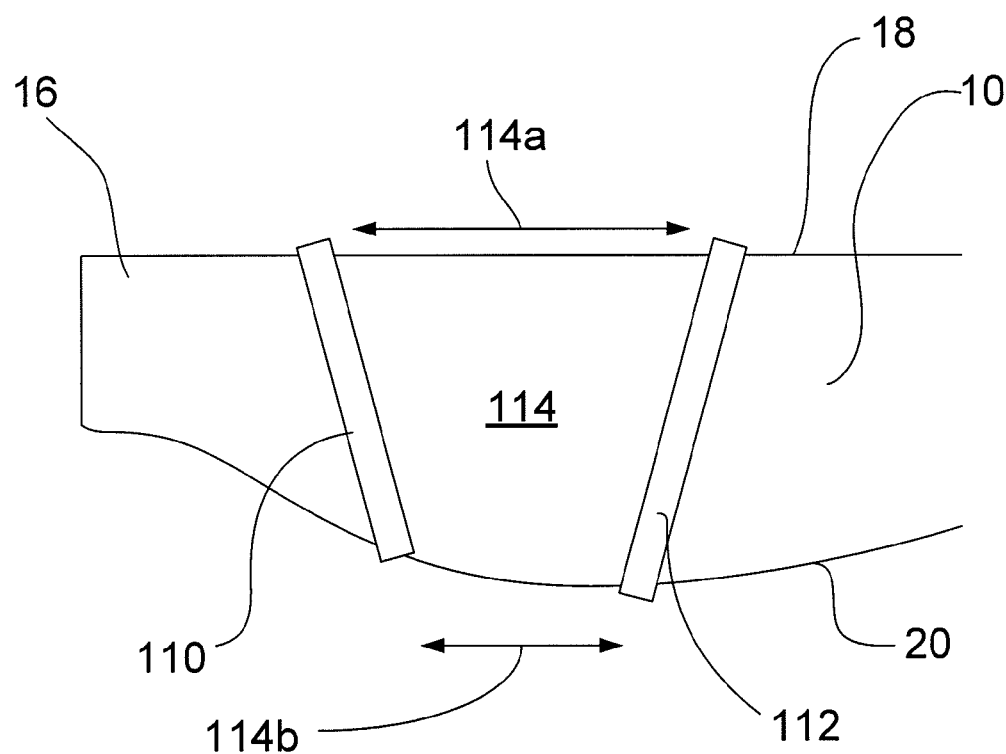
Figure 10B:
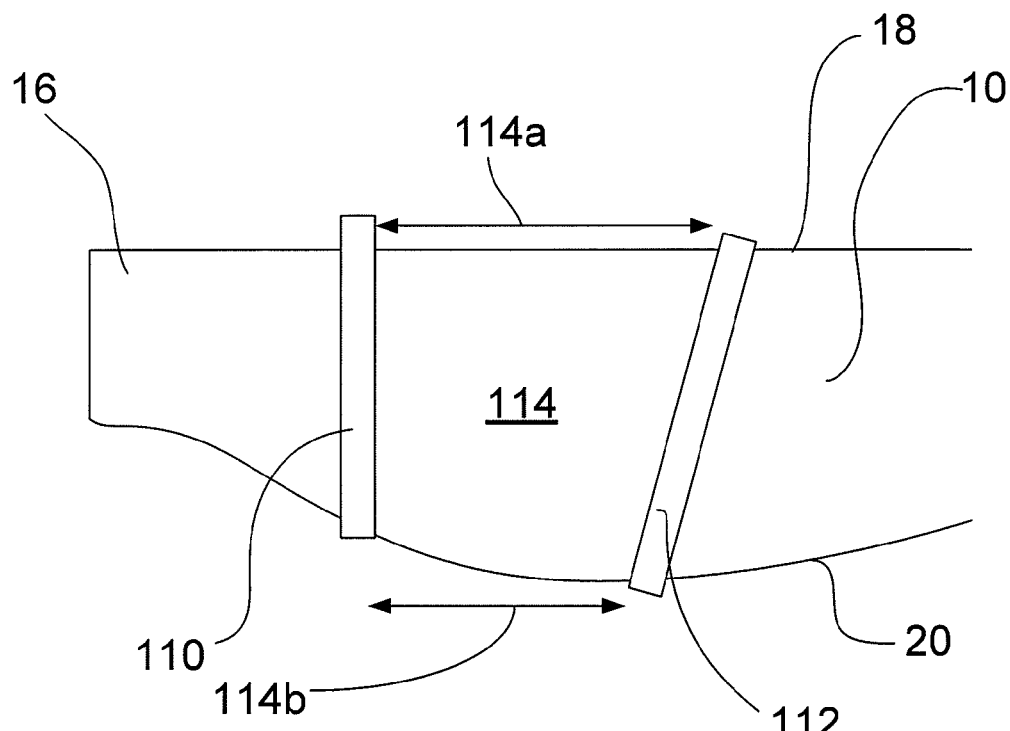
Figure 11A:
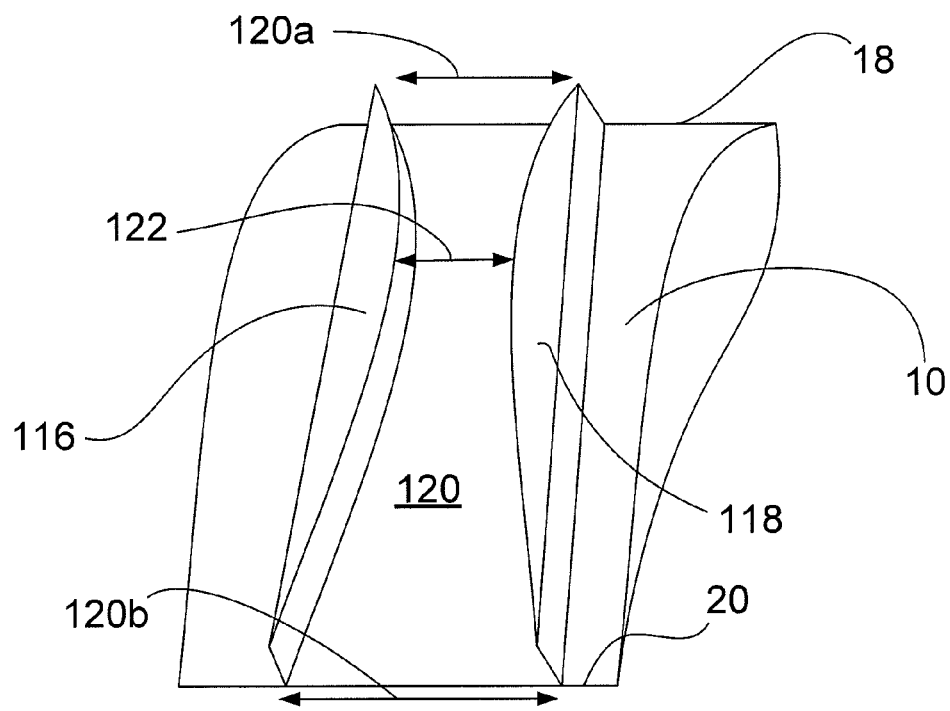
Figure 11B:
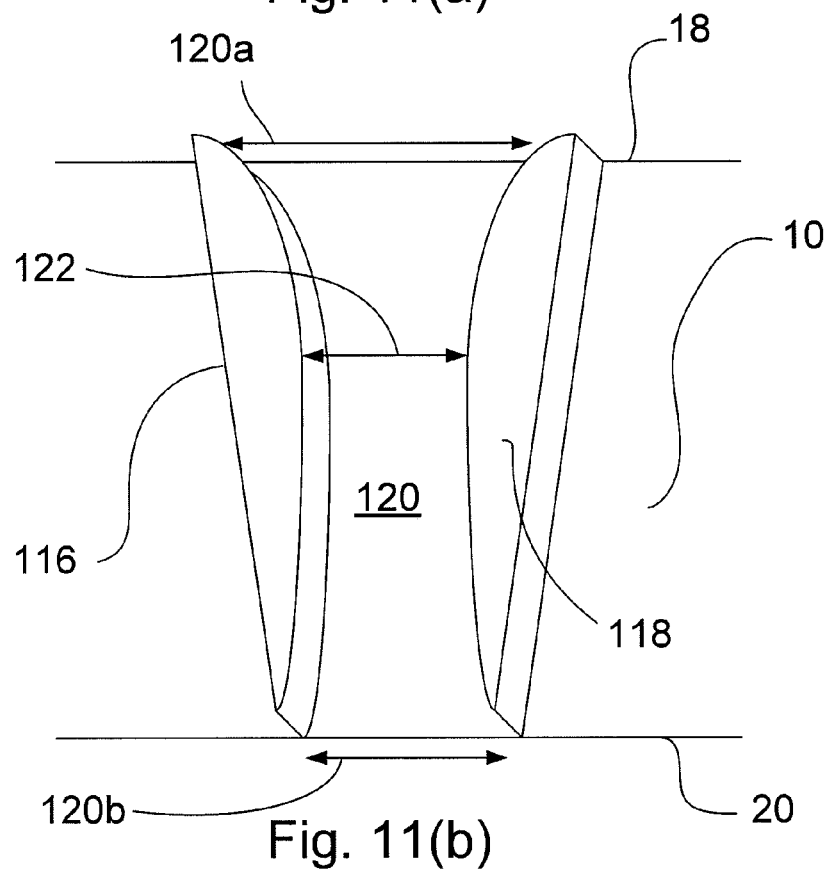

FIGS. 10(a) and 10(b) show plan views of a section of a wind turbine blade having first and second flow guide members configured according to further aspects of the invention; and FIGS. 11(a) and 11(b) show enlarged perspective views of a section of a wind turbine blade having first and second flow guide members configured according to further aspects of the invention.

It will be understood that elements common to the different embodiments of the invention have been provided with the same reference numerals in the drawings.

Figure 1:
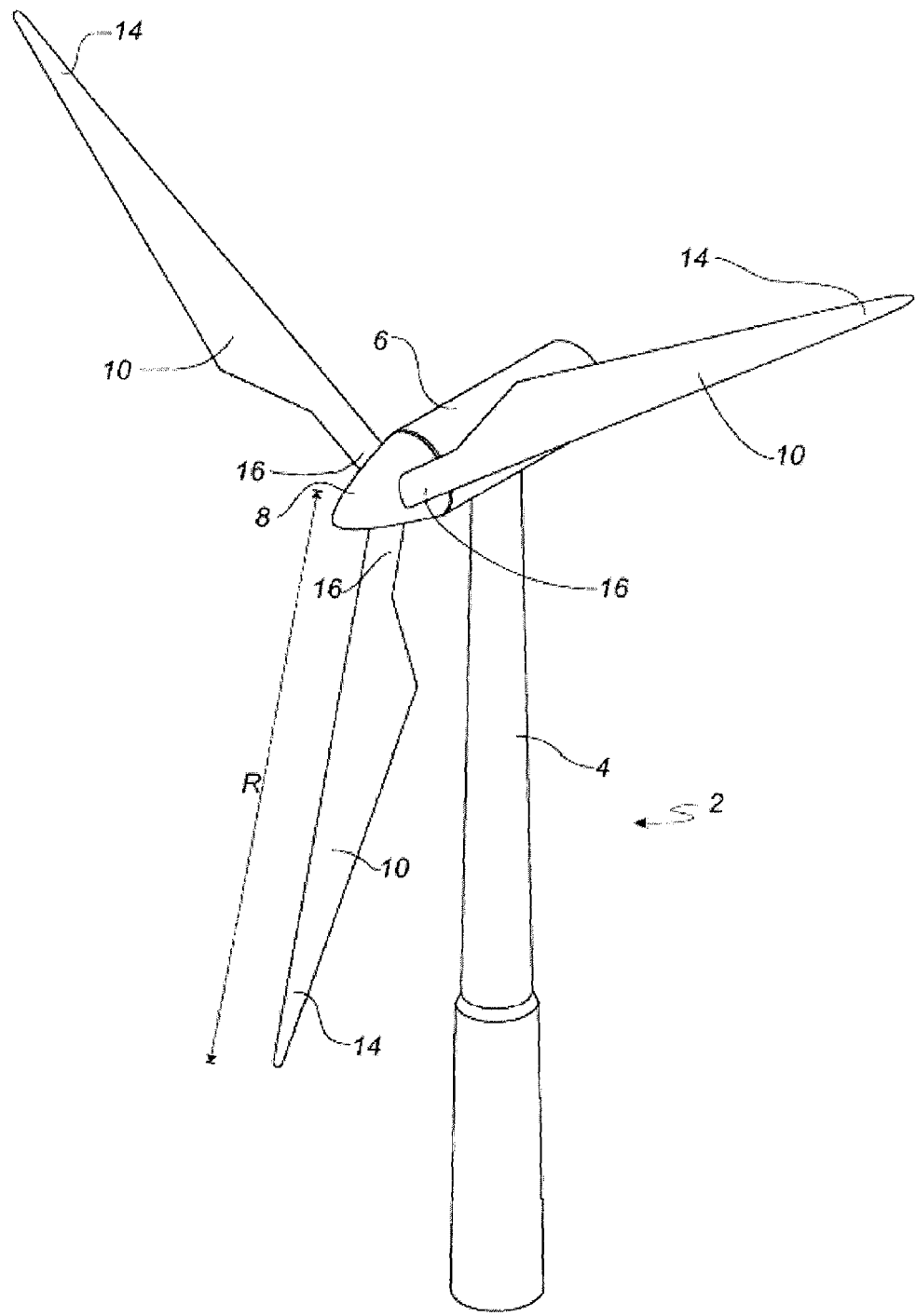
FIG. 1 shows a wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

Figure 2:
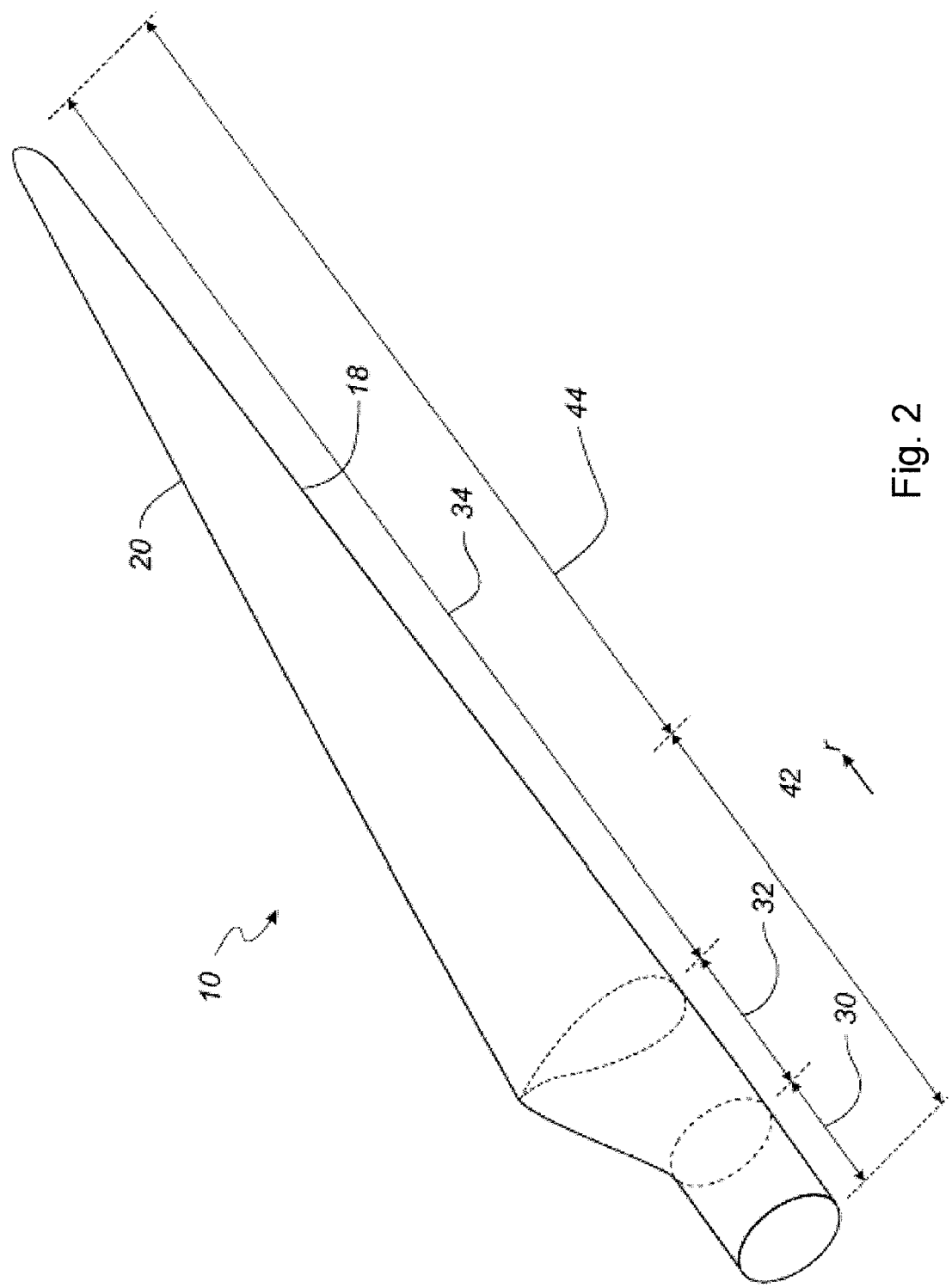
FIG. 2 shows a schematic view of a wind turbine blade according to the invention.

FIG. 2 shows a schematic view of a wind turbine blade 10. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape 40 of the root region 30 to the airfoil profile 50 of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figure 3:
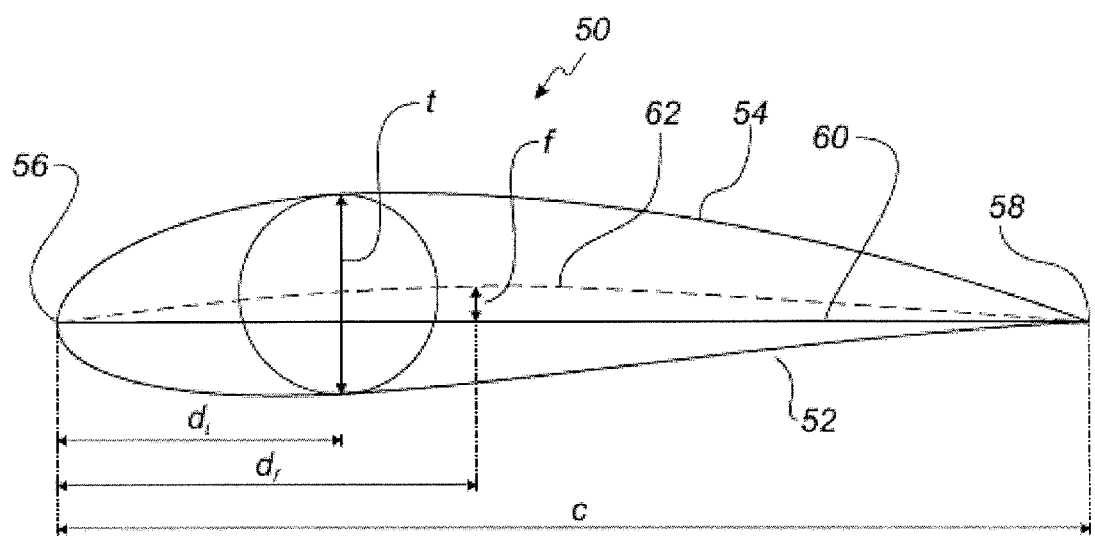
FIG. 3 shows a schematic view of an airfoil profile of the blade of FIG. 2.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber and lower camber, which are defined as the distances from the chord 60 and the suction side 54 and pressure side 52, respectively.

Airfoil profiles are often characterised by the following parameters: the chord length c, the maximum camber f, the position df of the maximum camber f, the maximum airfoil thickness t, which is the largest diameter of the inscribed circles along the median camber line 62, the position dt of the maximum thickness t, and a nose radius (not shown). These parameters are typically defined as ratios to the chord length c.

Wind turbine blades are generally formed from fibre-reinforced plastics material, i.e. glass fibres and/or carbon fibres which are arranged in a mould and cured with a resin to form a solid structure. Modern wind turbine blades can often be in excess of 30 or 40 meters in length, having blade root diameters of several meters. Wind turbine blades are generally designed for relatively long lifetimes and to withstand considerable structural and dynamic loading.

Figure 4:
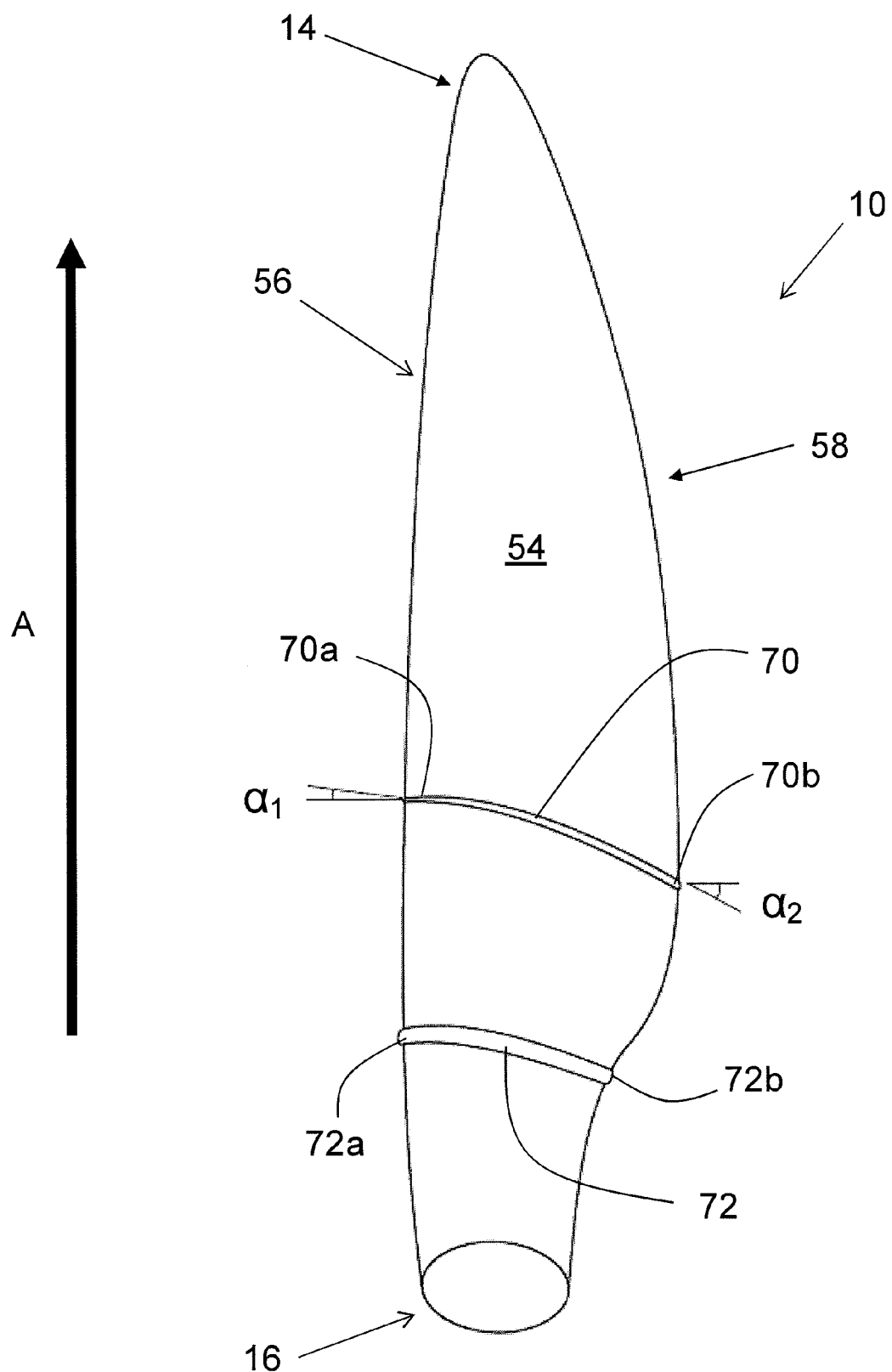
FIG. 4 shows a plan view of a wind turbine blade having at least one planar member according to a first embodiment of the invention.

With reference to FIG. 4, an embodiment of a wind turbine blade 10 according to the invention is illustrated. A first planar member 70 and a second planar member 72 project from the surface of the suction side 54 of the blade 10, the first and second planar members 70,72 extending from respective first ends 70a,72a adjacent the blade leading edge 56, to respective second ends 70b,72b adjacent the blade trailing edge 58.

The first and second planar members 70,72 are provided as stall fences or barriers, projecting from the blade surface to prevent or impede airflow along the longitudinal direction of the blade 10, as indicated by the arrow A. The first and second planar members 70,72 are located towards the root region of the blade 10, preferably within 50% of the longitudinal length of the blade from the root end 16.

Furthermore, the first and second planar members 70,72 are arranged to extend from said first ends 70a,72a towards said second ends 70b,72b at an acute angle to the chordal plane of the blade profile taken in the direction of the blade root end 16, the chordal plane being the plane orthogonal to the longitudinal axis of the blade 10 as indicated by the arrow A. The first and second planar members 70,72 extend from said first ends 70a,72a at the leading edge 56 towards said second ends 70b,72b at the trailing edge 58 at an acute angle in the direction of the root end 16 of the blade 10.

As the blade 10 rotates on a wind turbine 2, the centrifugal effect of the rotation effectively pushes the radial airflow towards the tip end 14 of the blade 10, which causes the root side flow separation to migrate towards the tip end 14.

Figure 5:
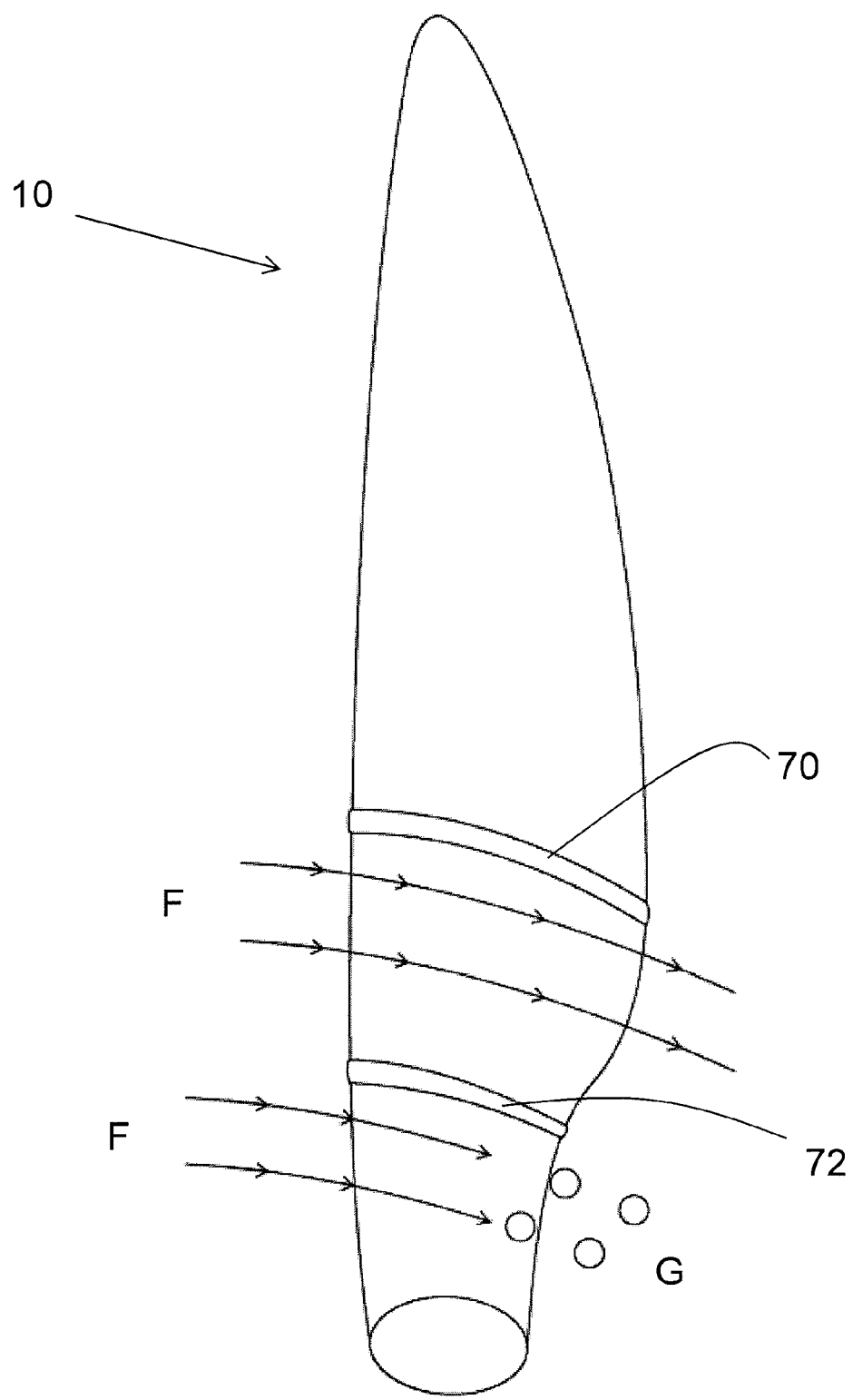
FIG. 5 shows a plan view of the wind turbine blade of FIG. 4 when impacted by an incident airflow.

With reference to FIG. 5, the provision of angled stall fences 70,72 towards the root end 16 of the blade 10 act to divert the airflow (indicated by arrows F) over the blade 10 in the root region, to direct the airflow towards the root end 16 of the blade 10, against the centrifugal forces. Accordingly, the angled stall fences 70,72 act to negate the radial pressure gradient created by the rotor blade, and reduce the flow separation moving towards the tip end 14 of the blade 10. This redirection of the airflow towards the root end 16 acts to regulate the pressure across the blade, thereby delaying airflow separation, and increasing blade lift and associated performance. The shaped stall fences can be further used to minimise turbulent vortices at the root end of the blade (indicated at G), thereby improving performance by decreasing drag.

In a first aspect, the angle $\alpha$ that the first and/or second planar members or stall fences 70,72 make to the chordal plane of the wind turbine blade 10 may vary along the length of the first and/or second stall fences 70,72. For example, in the embodiment of FIG. 4, the angle $\alpha$ of the first stall fence 70 varies from a first value $\alpha_1$ at the first end 70a of the stall fence to a second value $\alpha_2$ at the second end 70b of the stall fence.

Preferably, $\alpha_1$ is approximately 0 degrees, while $\alpha_2$ is between approximately 30-60 degrees. Accordingly, the stall fence 70 is varied to be substantially in line with the chordal plane of the blade 10 at the blade leading edge 56, and relatively offset from the chordal plane towards the trailing edge 58. This allows for the shape of the stall fence 70 to be varied along the length of the stall fence 70, so as to minimise the effect of blade performance at the leading edge 56 of the blade 10 (due to the minimised offset from the chord line of the blade) while providing a substantial redirection of airflow at the blade trailing edge 58.

In the embodiment of FIG. 4, the angle $\alpha$ made by the stall fences 70,72 varies substantially along the length of the stall fences, but it will be understood that alternative configurations may be implemented. In a first aspect, at least one of the stall fences 70,72 may extend at a constant angle $\alpha$ to the chordal plane. Additionally or alternatively, at least one of the stall fences may extend at a constant angle $\alpha$ along at least 30%, preferably at least 50%, further preferably at least 70% of the length of the stall fence. $\alpha$ may be selected as any suitable angle, e.g. between 30-60 degrees to the chordal plane, in the direction of the root end 16 of the blade 10.

Figure 6:
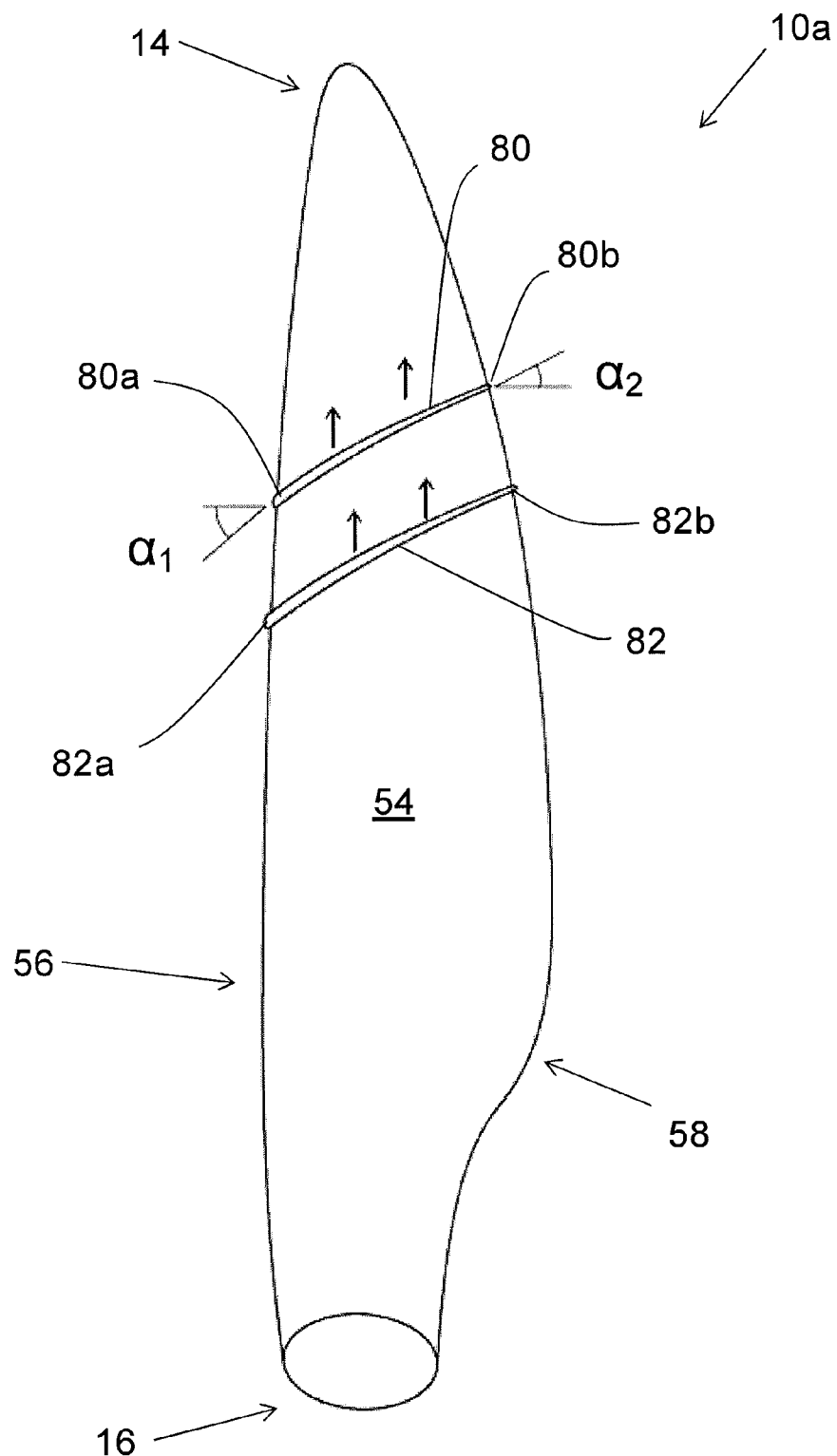
FIG. 6 shows a plan view of a wind turbine blade having at least one planar member according to a second embodiment of the invention.

With reference to FIG. 6, a further embodiment of a wind turbine blade according to the invention is indicated at 10a. In this embodiment, first and second flow diverters 80,82 are provided as planar members projecting from the surface of the suction side 54 of the blade 10, the first and second flow diverters 80,82 extending from respective first ends 80a,82a adjacent the blade leading edge 56, to respective second ends 80b,82b adjacent the blade trailing edge 58.

The first and second flow diverters 80,82 are arranged to extend from said first ends 80a,82a towards said second ends 80b,82b at an acute angle to the chordal plane of the blade profile, in the direction of the blade tip end 14. Accordingly, the first and second flow diverters 80,82 project from the blade surface to divert airflow over the blade in an outboard direction towards the tip end 14 of the blade 10a (in the direction of the arrows T). The first and second flow diverters 80,82 are located towards the tip region of the blade 10a, preferably within 50% of the longitudinal length of the blade from the tip end 14.

By pushing airflow in an outboard direction, the blade 10a is able to take advantage of the increased blade lift performance towards the blade tip end 14, thereby improving overall turbine performance.

As with the embodiment of FIG. 4, the first and second flow diverters 80,82 generally extend at an angle $\alpha$ to the chordal plane of the wind turbine blade 10a. In the embodiment of FIG. 6, $\alpha$ is an acute angle measured from the chordal plane of the blade 10a in the direction of the blade tip end 14.

In a first aspect, the angle $\alpha$ that the first and/or second flow diverters 80,82 make to the chordal plane of the wind turbine blade 10 may vary along the length of the flow diverters 80,82. For example, in the embodiment of FIG. 6, the angle $\alpha$ of the first flow diverter 80 varies from a first value $\alpha_1$ at the first end 80a of the flow diverter to a second value $\alpha_2$ at the second end 80b of the flow diverter. Preferably, $\alpha_1$ is approximately 0 degrees, while $\alpha_2$ is between approximately 30-60 degrees, in the direction of the blade tip end 14.

Accordingly, the flow diverter 80 is varied to be substantially in line with the chordal plane of the blade 10 at the blade leading edge 56, and relatively offset from the chordal plane towards the trailing edge 58. As with the embodiment of FIG. 4, This allows for the shape of the flow diverter 80 to be varied along the length of the diverter, so as to minimise the effect of blade performance at the leading edge 56 of the blade 10 (due to the minimised offset from the chord line of the blade) while providing a substantial redirection of airflow at the blade trailing edge 58.

In an alternative implementation, at least one of the flow diverters 80,82 may extend at a constant angle $\alpha$ to the chordal plane, in the direction of the blade tip end 14. Additionally or alternatively, at least one of the flow diverters may extend at a constant angle $\alpha$ along at least 30%, preferably at least 50%, further preferably at least 70% of the length of the flow diverter. $\alpha$ may be selected as any suitable angle, e.g. between 30-60 degrees to the chordal plane, in the direction of the tip end 14 of the blade 10.

In the embodiments of FIGS. 4 and 6, the planar members in the form of stall fences 70,72 or flow diverters 80,82 are arranged such that the respective first ends 70a,72a,80a,82a are adjacent the blade leading edge 56, and the respective second ends 70b,72b,80b,82b are adjacent the blade trailing edge 58. It will be understood that any suitable arrangement of the planar members may be provided, for example the respective first ends 70a,72a,80a,82a may be provided within 0-5% of the leading edge 56, and/or the respective second ends 70b,72b,80b,82b may be provided within 0-5% of the trailing edge 58.

In an alternative embodiment, the planar member 70,72, 80,82 may extend along only a portion of the chordal extent of the wind turbine blade profile, e.g. between approximately 0-70% of the chordal length of the profile measured from the leading edge, between 0-70% of the chordal length of the profile measured from the trailing edge, or between 15-85% of the chordal length of the profile measured from the leading edge.

Figure 7A:
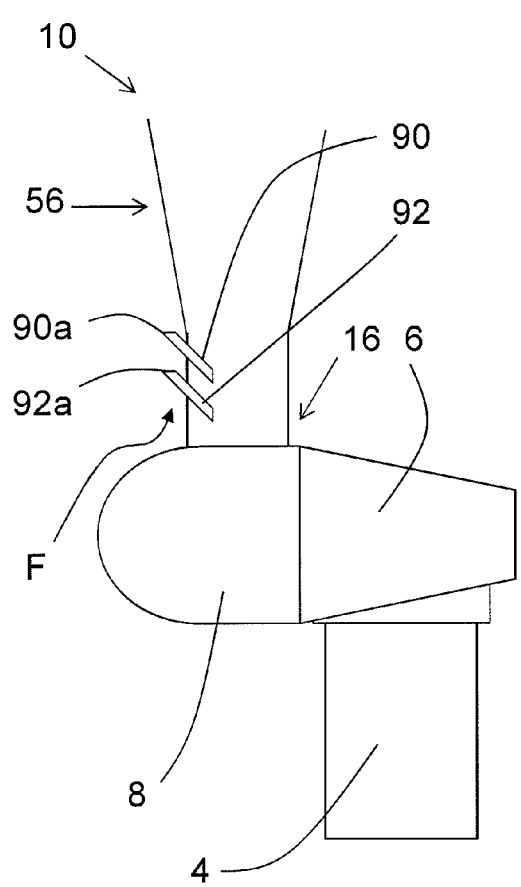
FIG. 7 shows a plan view of a wind turbine blade having at least one planar member according to a third embodiment of the invention.

In a further enhancement of the invention, the respective first ends 70a,72a,80a,82a of the planar members 70,72,80, 82 may project beyond the leading edge 56 of the wind turbine blade 10. With reference to FIGS. 7(a) and (b), an enlarged view of a hub 8 and nacelle 6 section of a wind turbine 2 having a wind turbine blade 10 with first and second planar members 90,92 are illustrated, said first and second planar members 90,92 provided towards the root end 16 of the wind turbine blade 10. The respective first ends 90a,92a of the projecting planar members 90,92 project proud of the leading edge 56 of the blade 10, such that the outbound airflow from the root end 16 of the blade and/or the flow diverted due to the presence of the hub 8 (as indicated by arrow F) is deflected and directed towards the blade root end 16, thereby preventing further cross-flow along the blade length, leading to subsequent separation of attached flow along the length of the blade 10.

In FIG. 7(a), the projecting planar members 90,92 are illustrated as extending along a portion of the chordal length of the blade profile, preferably at an angle to the chordal plane of the blade in the direction of the blade root end 16, as described in the above embodiment of FIG. 4.

Figure 7B:
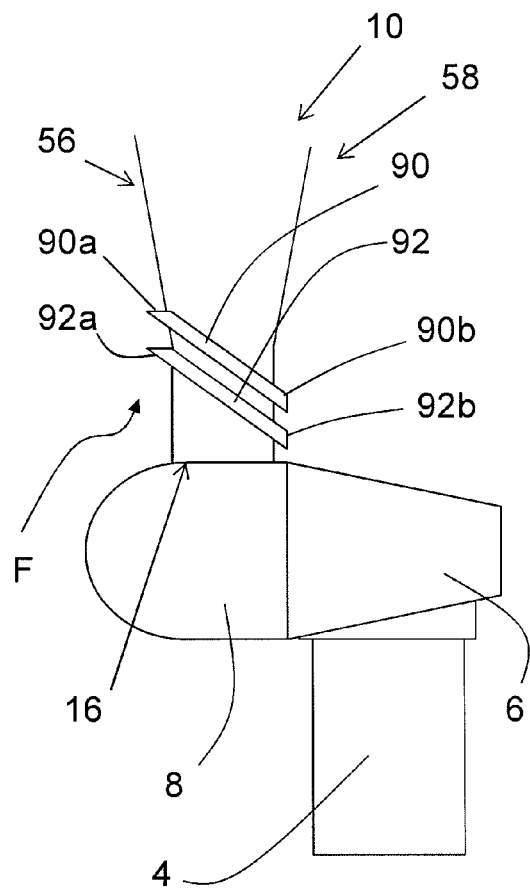

In FIG. 7(b), the projecting planar members 90,92 are illustrated as extending along substantially the entire chordal length of the blade profile, preferably at an angle to the chordal plane of the blade in the direction of the blade root end 16, as described in the above embodiment of FIG. 4. Furthermore, the respective second ends 90b,92b of the projecting planar members 90,92 may project beyond the trailing edge 58 of the blade 10, in order to provide for a more extensive flow redirection.

In a further enhancement of the invention, the planar members 70,72,80,82,90,92 may comprise channels, spacing, or gaps defined in the members to provide for a venting of air pressure between either side of the members, to reduce or ameliorate any possible drag effect generated by the planar members or any other feature which may have a negative impact on blade performance.

Figure 8:
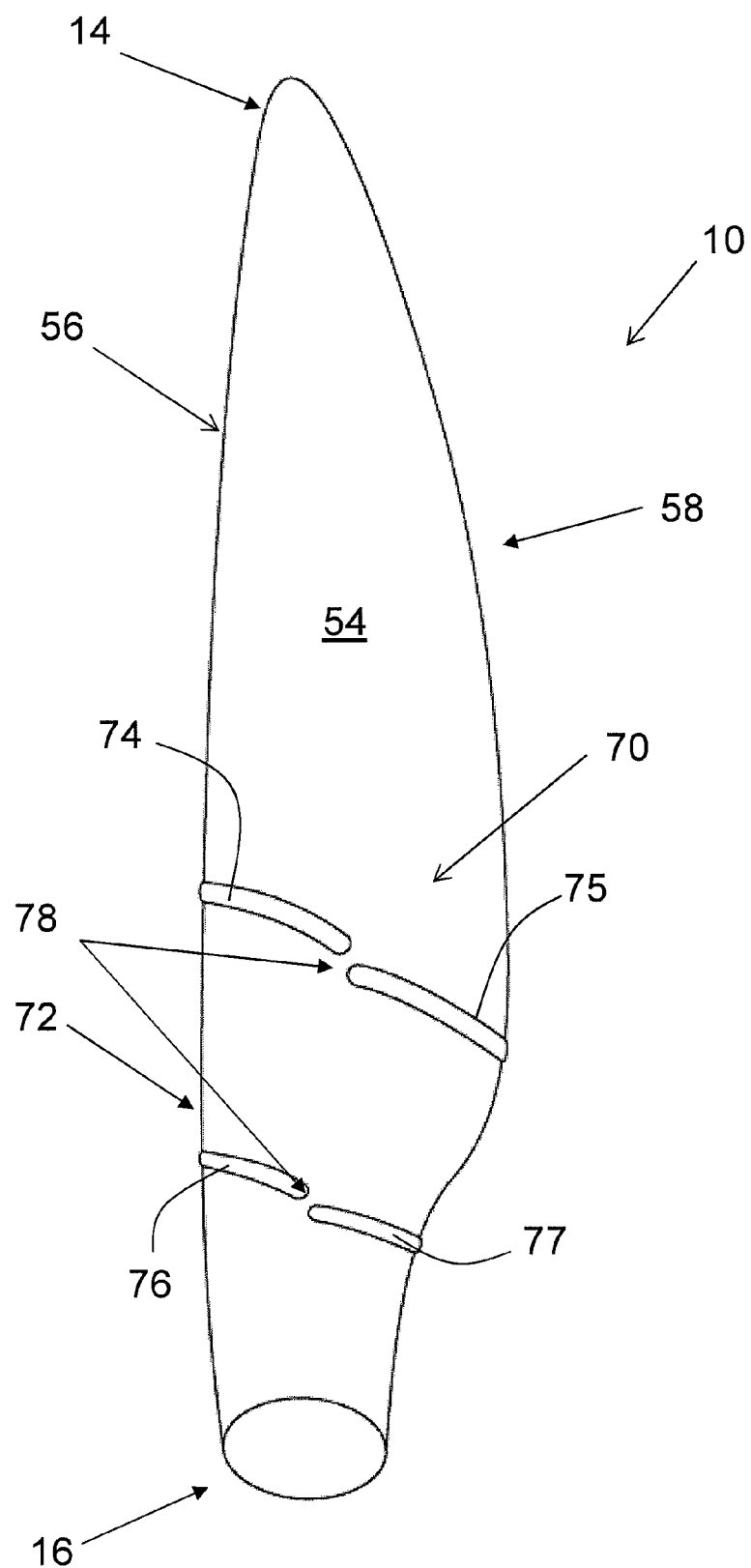
FIG. 8 shows a wind turbine blade having at least one planar member according to a fourth embodiment of the invention.

With reference to FIG. 8, an embodiment of the invention is illustrated wherein first and second planar members 70,72 are provided as two separate sections—first planar member 70 provided as a first stall fence section 74 located towards the blade leading edge 56 and a second stall fence section 75 located towards the blade trailing edge 58, and second planar member 72 provided as a first stall fence section 76 located towards the blade leading edge 56 and a second stall fence section 77 located towards the blade trailing edge 58. The sections are arranged such that a gap 78 is defined between the respective first stall fence sections 74,76 and the respective second stall fence sections 75,77, such a gap 78 allowing for a portion of airflow to vent or leak between the sides of the first and second planar members 70,72 to provide for a pressure equalisation between the sides, and thereby reduce any negative lift characteristics associated with the shaped stall fences. Furthermore, the provision of the planar members as an assembly of separate sections provides for increased ease of manufacturing and assembly, e.g. in the case of retrofitting such a shaped planar member to an existing wind turbine blade.

In a further aspect of the invention, the cross-section of the planar members may be shaped to provide for improved performance of the wind turbine blade. FIG. 9 illustrates several possible planar member cross-sections for use with any of the embodiments of the invention, the planar members 100 having a base end 100a provided at the surface 102 of a wind turbine blade 10, and a distal end 100b.

Figure 9A:
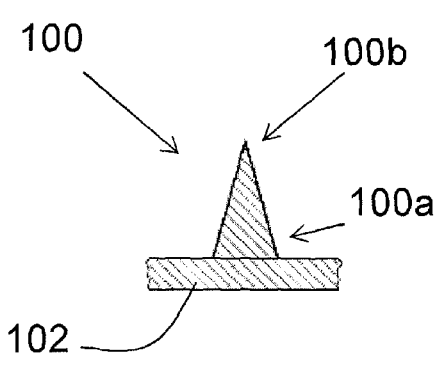
FIG. 9 illustrates a series of cross-sectional views of a planar member of a wind turbine blade according to the invention.

FIG. 9(a) illustrates a planar member 100 which projects from the surface 102 of a wind turbine blade, wherein the planar member 100 projects at an orthogonal angle β to the blade surface 102.

Figure 9B:
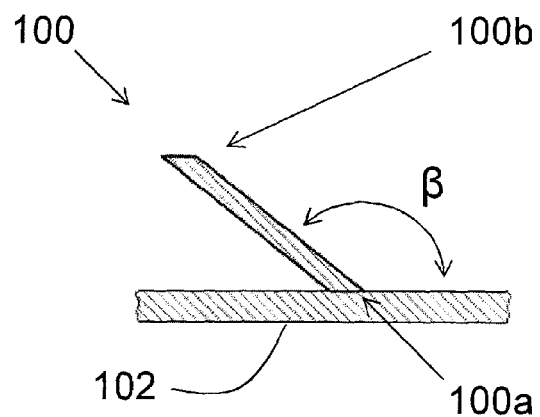
Figure 9C:
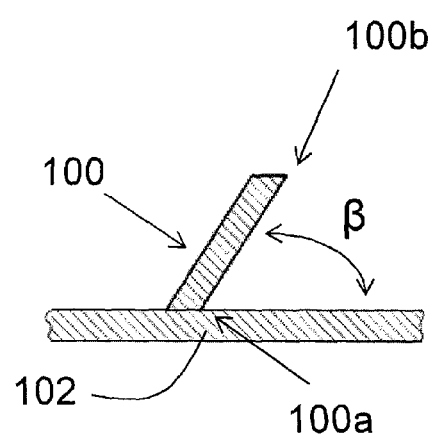

FIG. 9(b) illustrates a planar member 100 which projects from the surface 102 of a wind turbine blade, wherein the planar member 100 projects at an obtuse angle β to the blade surface 102. FIG. 9(c) illustrates a planar member 100 which projects from the surface 102 of a wind turbine blade, wherein the planar member 100 projects at an acute angle β to the blade surface 102.

Preferably, the planar members are arranged such that the tip ends 100b of the members substantially project in the direction of desired flow redirection, e.g. such that the stall fences 70,72 project at an acute angle β to the blade surface 102, measured in the direction of the blade root end 16. Similarly, preferably the flow diverters 80,82 project at an acute angle β to the blade surface 102, measured in the direction of the blade tip end 14 (or at an obtuse angle β measured in the direction of the blade root end 16). Preferably, the planar member 100 projects at a constant angle β to said surface 102, wherein said angle β is selected from the range between +/−45-135 degrees.

Figure 9D:
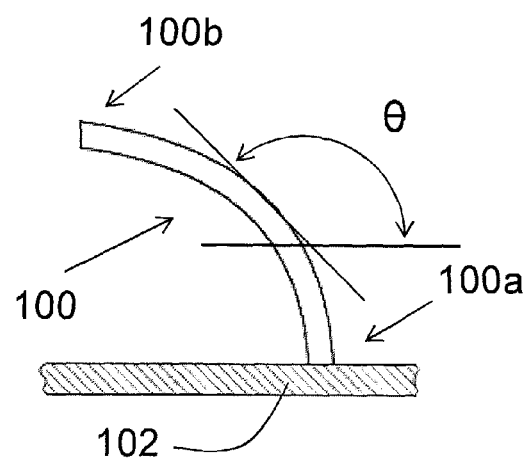

FIG. 9(d) illustrates a planar member 100 which projects from the surface 102 of a wind turbine blade, wherein the planar member 100 comprises a curved cross-section. In FIG. 9(d), the planar member 100 is curved such that the base end 100a is substantially orthogonal to the blade surface 102, while the tip end 100b is substantially parallel to the blade surface 100, i.e. the tangential angle θ of the planar member 100 varies between approximately 90 degrees at said base end 100a and approximately 180 degrees at said tip end 100b. However, it will be understood that other cross-sectional curve shapes may be implemented.

The provision of a shaped-cross-section of planar member allows for a more effective redirection of airflow by the planar members.

In a further enhancement of the invention, the cross-sectional shape of the planar members 70,72,80,82,90,92 may vary between the respective first and second ends of said planar members.

In a first aspect, the planar member 100 may be shaped along the length of the planar member such that the angle β varies from approximately 0 degrees at the first end of the planar member, i.e. wherein the planar member does not project proud of the surface of the wind turbine blade, to between approximately 35-180 degrees at the second end of the planar member, i.e. wherein the planar member may be shaped to redirect airflow with increasing effectiveness along the length of the planar member. Preferably, the planar member is shaped such that the tip end of the planar member substantially points in the desired direction of flow at the second end of the planar member, i.e. towards the root end for the stall fence embodiment, and towards the tip end for the flow diverter embodiment.

In a further aspect, the planar member 100 may be shaped to have a curved cross-section, wherein the extent of the curve of the planar member may vary between the first end and the second end of the planar member. The curved section may be varied so as to have a minimal curve towards the leading edge of the blade, and accordingly reduce the aerodynamic impact of the planar member at the leading edge, and a more pronounced curve towards the trailing edge, thereby having an increased redirection effect towards the trailing edge of the blade.

In a further aspect, the planar member may comprise a first relatively straight portion, e.g. provided at the base end of the planar member, and a second relatively curved portion, e.g. provided at the tip end of the planar member.

It will be understood that a projecting planar member for a blade may be provided having an angle α with respect to the chordal plane of the blade, and an angle β with respect to the blade surface, the planar member arranged such that the values α and/or β vary between the first and second ends of the planar member, preferably in a linear variation along at least 30% of the length of the planar member. Additionally or alternatively, the projecting planar member may be provided with at least one curved section having a tangential angle θ, the planar member arranged such that the value θ varies between the first and second ends of the planar member, preferably in a linear variation along at least 30% of the length of the planar member.

With reference to FIGS. 10 and 11, a further aspect of the invention may involve the use of converging stall fences or barriers to form a Venturi effect on airflow moving over a wind turbine blade, in order to accelerate core airflow over the blade to delay airflow separation, the stall fences also used to prevent blade cross-flow.

An inboard section of a wind turbine blade 10 is illustrated in FIG. 10(a), looking along a portion of the length of the wind turbine blade from the root end 16. In this embodiment, first and second planar members 110,112, e.g. stall fences or barriers, are provided on the surface of the wind turbine blade 10, preferably on the suction side of the blade, extending between the leading edge 18 and the trailing edge 20 of the blade 10. The planar members 110,112 are arranged adjacent one another, to form a flow channel 114 between the opposed planar members 110,112. The flow channel 114 extends from a first end 114a provided towards the leading edge 18 of the blade 10 towards a second end 114b towards the trailing edge 20 of the blade 10. Similar to the embodiments described above, the planar members 110,112 are arranged at an angle to the chordal plane of the blade 10. However, in the embodiments of FIG. 10, the planar members are arranged such that they extend in a converging direction from the first end 114 of the flow channel 114 to the second end 114b.

Accordingly, the width of the flow channel 114 is greater at the first end 114a than the second end 114b. Such a configuration means that the core flow which passes between the planar members 110,112 in the flow channel 114 is subjected to a constriction in width between the opposed planar members 110,112, moving from the first end 114a of the flow channel 114 to the second end 114b. Such a constriction in the flow channel 114 results in a Venturi effect applying to airflow in the flow channel 114, which results in an increase in flow speed through the channel 114. This will result in higher flow momentum both inside and outside the boundary layer.

As airflow separation often occurs towards the root end of a blade, where the airfoils are relatively thick, providing such a Venturi effect towards the inboard portion of a wind turbine blade should act to delay airflow separation in this area by reducing the effect of the pressure gradients in this area, due to the higher airflow momentum as a result of increased mean flow speed. Furthermore, the planar members continue to restrict blade cross-flow along the longitudinal direction of the blade.

In order to provide a balance between the constriction effect necessary for the Venturi effect, preferably, at least one of the planar members extends at an angle of at least 15 degrees to the chordal plane of the blade. While the embodiment of FIG. 10(a) illustrates configuration wherein both planar members 110,112 are provided at an acute angle to the chordal plane of the blade, extending in a convergent direction towards the trailing edge 20 of the blade, it will be understood that only one of the planar members may be provided in an angled arrangement to ensure the Venturi effect.

With reference to the embodiment of FIG. 10(b), the first planar member 110 is located substantially parallel to the chordal plane of the blade, while the second planar member 112 extends from the leading edge 18 towards the trailing edge 20 at an angle to the chordal plane of the blade. Accordingly, the flow channel 114 defined between the planar members 110,112 extends from a relatively wide first end 114a to a relatively narrow second end 114b.

A further enhancement of the invention is illustrated in the two embodiments shown in FIG. 11. Here, the stall fences or barriers are provided as first and second profiled members 116,118, wherein a flow channel 120 is defined between the profiled members 116,118. The flow channel 120 extends from a first end 120a provided towards the blade leading edge 18 to a second end 120b provided towards the blade trailing edge 20. The profiled members 116,118 are shaped such that at least one, preferably both, of the members 116,118 gradually extends towards the opposed profiled member 116,118 to a point between the first and second ends 120a,120b of the flow channel 120, preferably in a gradual curve. Such a configuration results in a section (indicated by 122) of the flow channel 120 between the first and second ends 120a,120b having a relatively constricted width. This constriction 122 provides a Venturi effect within the flow channel 120, between the first and second ends 120a,120b. Accordingly, airflow within the flow channel 120 will be sped up, with the increased airflow momentum resulting in a delay in airflow separation over the blade 10.

The location of said constriction 122 may be selected based on the relative thickness of the airfoil, with the constriction 122 preferably located approximately at the point of maximum airfoil thickness, for example within 5% of the chordal length of the airfoil of the point of maximum airfoil thickness t at that point along the length of the blade.

It will be understood that such a configuration may be implemented in numerous different configurations. FIG. 11(a) illustrates an embodiment wherein the flow channel 120 narrows from the first end 120a to the single constriction at 122, before widening to the second end 120b. In this embodiment, the second end 120b of the flow channel 120 is relatively wider than the first end 120a, such that a single Venturi effect is created by the constricted section 122.

With reference to FIG. 11(b), the profiled members 116, 118 forming the flow channel 120 extend from the constricted section 122 towards the second end 120b such that second end 120b is relatively narrower than first end 120a. Accordingly, the profiled members 116,118 extend in a substantially convergent direction from the first end 120*a* to the second end 120*b*, effectively creating two constriction sections—a first constriction at the constricted section 122 located between the first and second ends 120*a*,120*b* of the flow channel 120, and a second effective constriction formed at the second end 120*b* of the flow channel 120, due to the narrowing of the flow channel 120 between the first end 120*a* and the second end 120*b*. This configuration provides a double Venturi effect, acting to increase the flow speed over the airfoil.

It will be understood that any suitable shape of profiled members may be used, in order to create any number or configuration of constrictions in the flow channel 120.

Preferably, the members 110,112,116,118 extend between the leading edge 18 and the trailing edge 20 of the blade, but it will be understood that the length of the planar members 110,112,116,118 may be selected based on requirements, e.g. approximately 80% of the chordal length of the blade at that point.

It will be understood that number or any combination of the elements of any of the preceding embodiments may be provided on a single wind turbine blade, e.g. the stall fences 70,72 of the embodiment of FIG. 4 may be combined with the flow diverters of the embodiment of FIG. 6, the planar members 110,112,116,118 may have variable height and/or curvature along their length, etc.

The invention is not limited to the embodiment described herein, and may be modified or adapted without departing from the scope of the present invention.

The invention claimed is:

1. A wind turbine blade for a rotor of a wind turbine having a substantially horizontal rotor shaft, said rotor comprising a hub, from which the blade extends substantially in a radial direction when mounted to the hub, the blade having a longitudinal direction with a tip end and a root end and a transverse direction, the blade further comprising:

a profiled contour including a pressure side and a suction side, as well as a leading edge and a trailing edge with a chord line having a chord length extending there between, the chord line transverse to said longitudinal direction, the profiled contour, when being impacted by an incident air-flow, generating a lift, wherein the wind turbine further comprises first and second flow guide members provided on a surface of said wind turbine blade, wherein said first and second flow guide members extend in a direction substantially transverse to the longitudinal direction of the blade, said first and second flow guide members defining a flow channel between said leading edge and said trailing edge, said flow channel having a first end located towards said leading edge and a second end located towards said trailing edge, wherein at least a portion of one of said first and second flow guide members extends along the transverse direction of said blade at an angle to said chord line of between +/−[15 to 60] degrees, wherein said flow channel comprises at least one constricted section spaced from said first end towards said second end, wherein the distance between said first and second flow guide members at said at least one constricted section is less than the distance between said first and second flow guide members at the first end of said flow channel, such that attached flow in said flow channel between said first and second flow guide members from said first end to said second end is subjected to a Venturi effect by said at least one constricted section, and wherein the length between said first end and said second end of said flow channel is between approximately 50-100% of chord length of the wind turbine blade at the location of said flow channel.

2. The wind turbine blade of claim 1, wherein said at least one constricted section is located at said second end of said flow channel.

3. The wind turbine blade of claim 1, wherein the flow channel of the wind turbine blade comprises at least one constricted section located between said first end and said second end.

4. The wind turbine blade of claim 1, wherein the wind turbine blade comprises a first constricted section located between said first end and said second end of said flow channel and a second constricted section located at said second end of said flow channel, wherein the width of said flow channel between said first and second flow guide members tapers from said first end to said first constricted section and subsequently widens towards said second end to provide a first Venturi effect on flow in said flow channel, and wherein the width of said flow channel between said first and second flow guide members subsequently tapers towards said second constricted section at the second end of said flow guide channel to provide a second Venturi effect.

5. The wind turbine blade of claim 4, wherein said first constricted section of said flow channel is located between said leading edge and said trailing edge approximately at the area of maximum thickness of the profiled contour.

6. The wind turbine blade of claim 1, wherein said first and second flow guide members comprise respective flow channel surfaces, the flow channel surfaces of said first flow guide facing the flow channel surface of said second flow guide across said flow channel, wherein at least a portion of at least one of said flow channel surfaces is curved.

7. The wind turbine blade of claim 1, wherein at least a portion of said first and second flow guide members extend in a convergent direction towards the second end of said flow channel to form said at least one constricted section, such that attached flow in said flow channel between said first and second flow guide members is subjected to a Venturi effect.

8. The wind turbine blade of claim 1, wherein one of said first and second flow guide members extends substantially along the transverse direction of said blade at an angle to said chord line of between +/−[15 to 60] degrees, wherein the other of said first and second flow guide members extends along the transverse direction of said blade parallel to said chord line.

9. The wind turbine blade of claim 1, wherein the flow guide members are formed from planar members projecting from the surface of the wind turbine blade.

10. The wind turbine blade of claim 9, wherein the planar members projecting from the surface of the wind turbine blade comprise a stall fence or stall barrier.

11. The wind turbine blade of claim 1, wherein said flow channel is formed from flow guide members provided on the suction side of the wind turbine blade.

12. The wind turbine blade of claim 1, wherein said first and second flow guide members are located on the inboard portion of the blade.

13. The wind turbine blade of claim 12, wherein said first and second flow guide members are located on the inboard portion of the blade within 50% of the length of the blade from the root end of the blade.

14. The wind turbine blade of claim 1, wherein the width of said flow channel at said at least one constricted section is between approximately 50-80% of the width of said flow channel at said first end.

15. The wind turbine blade of claim 1, wherein said first end of said flow channel is located adjacent the leading edge of the blade.

16. The wind turbine blade of claim 15, wherein said first end of said flow channel is located adjacent the leading edge of the blade within approximately 20% of chord length of the wind turbine blade at the location of said flow channel.

17. A wind turbine having at least one wind turbine blade as claimed in claim 1.

18. A wind turbine blade for a rotor of a wind turbine having a substantially horizontal rotor shaft, said rotor comprising a hub, from which the blade extends substantially in a radial direction when mounted to the hub, the blade having a longitudinal direction with a tip end and a root end and a transverse direction, the blade further comprising:
- a profiled contour including a pressure side and a suction side, as well as a leading edge and a trailing edge with a chord line having a chord length extending there between, the chord line transverse to said longitudinal direction, the profiled contour, when being impacted by an incident air-flow, generating a lift,
- wherein the wind turbine further comprises first and second flow guide members provided on a surface of said wind turbine blade, wherein said first and second flow guide members extend in a direction substantially transverse to the longitudinal direction of the blade, said first and second flow guide members defining a flow channel between said leading edge and said trailing edge, said flow channel having a first end located towards said leading edge and a second end located towards said trailing edge,
- wherein at least a portion of one of said first and second flow guide members extends along the transverse direction of said blade at an angle to said chord line of between +/−[15 to 60] degrees,
- wherein said flow channel comprises at least one constricted section spaced from said first end towards said second end, wherein the distance between said first and second flow guide members at said at least one constricted section is less than the distance between said first and second flow guide members at the first end of said flow channel,
- such that attached flow in said flow channel between said first and second flow guide members from said first end to said second end is subjected to a Venturi effect by said at least one constricted section,
- wherein the wind turbine blade comprises a first constricted section located between said first end and said second end of said flow channel and a second constricted section located at said second end of said flow channel,
- wherein the width of said flow channel between said first and second flow guide members tapers from said first end to said first constricted section and subsequently widens towards said second end to provide a first Venturi effect on flow in said flow channel, and
- wherein the width of said flow channel between said first and second flow guide members subsequently tapers towards said second constricted section at the second end of said flow guide channel to provide a second Venturi effect.

* * * * *